United States Patent [19]

Cawthon

[11] Patent Number: 5,720,842
[45] Date of Patent: Feb. 24, 1998

[54] PANEL CONSTRUCTION

[76] Inventor: Albert V. Cawthon, c/o PHC Industries, Inc. 1643 Haddon Ave., Camden, N.J. 08103

[21] Appl. No.: 547,972

[22] Filed: Oct. 25, 1995

[51] Int. Cl.$^6$ .................................................. B29C 33/08
[52] U.S. Cl. ........................... 156/274.4; 156/380.2; 156/380.5; 156/380.6
[58] Field of Search .................... 156/380.2–380.6, 156/212, 214, 272.2, 274.4, 379.6, 379.8, 475; 219/765, 774, 780

[56] References Cited

U.S. PATENT DOCUMENTS

| | | | |
|---|---|---|---|
| 4,016,025 | 4/1977 | Peterson | 156/380.2 |
| 5,187,340 | 2/1993 | Machule | 156/380.6 |
| 5,336,352 | 8/1994 | Tokura | 156/380.5 |

Primary Examiner—Michael W. Ball
Assistant Examiner—Michael A. Tolin
Attorney, Agent, or Firm—Zachary T. Wobensmith, III

[57] ABSTRACT

Panel construction for forming upholstery panels for use in automotive vehicles and the like, where a plastic substrate which has been formed to a desired configuration, is placed over a grounded metal horn, a layer of adhesive fabric is placed over the substrate, a layer of heat bondable foam is placed over the adhesive fabric, a cover layer is placed over the foam, heat seal punches connected to the positive output of a source of electrical energy are selectively brought in horizontally on all sides of the panel perimeter to successively compress the cover and foam against the sides of the substrate. Electrical energy is applied to the heat seal punches when in selective engaged position to melt the adhesive and the foam, and fasten the cover to the substrate. The punches are withdrawn and the completed panel is removed from the horn.

2 Claims, 2 Drawing Sheets

PANEL CONSTRUCTION

BACKGROUND OF THE INVENTION

1. Field of the Invention

This invention relates to apparatus for automotive panel construction, of the type where a panel cover is secured to a panel substrate by adhesive and heat bondable foam using dielectric sealing in a die under pressure, and around the outside perimeter of the panel by use of horizontally travelling heat seal punches which cause the adhesive and/or foam to melt, thereby bonding to the substrate.

2. Description of the Prior Art

In designing and manufacturing panels for use in automotive doors, prime considerations include low cost, ease of manufacture and assembly, and the finished appearance of the panel assembly. Many of the panels are upholstered panels which are component parts of a larger door panel. One of the common methods of fastening upholstered panels in or to door panels, is to use toy tabs of soft metal carried on the panels, which fit into holes on the door panel and are bent down to secure them. The prior art panels are usually formed from die cut sheet plastic to which a piece of foam and a cover are applied, with the cover pulled over the edges, glued and then the panel assembly is cut out with a blade or die. These structures suffer from many disadvantages in that the edges are not smooth, the covers can separate from the substrate, the panels due to manufacturing variances may not fit well into complete door panels, and suffer from other problems.

The panel construction of the invention provides a panel having a pleasing rolled edge around the panel perimeter, the panels can be snapped into cutouts in the door panels, the panels are lighter in weight, recyclable and considerably cheaper than prior art structures.

SUMMARY OF THE INVENTION

It has now been found that an improved panel construction is available wherein a pre-formed piece of plastic substrate is placed over a grounded horn portion of a die, a layer of adhesive fabric is placed on the substrate, a layer of heat bondable foam is placed over the adhesive layer, a cover layer is placed over the foam layer, horizontally travelling dielectric heat seal punches are successively brought in against the perimeter of the panel compressing the layers against the substrate, dielectric energy is applied to cause the foam and adhesive to melt and adhere to the substrate around the panel perimeter. The punches are retracted and the completed panel removed from the horn.

The principal object of the invention is to provide panel construction for a multi-layered panel where the edges are electrically heat sealed by horizontally travelling punches.

A further object of the invention is to provide panel construction wherein the finished panel has a rolled edge.

A further object of the invention is to provide panel construction wherein the finished panel is of light weight and is recyclable.

A further object of the invention is to provide panel construction wherein the finished panel is inexpensive to construct, but is long lasting in service.

A further object of the invention is to provide panel construction wherein the finished panel is easy to assemble to a larger panel and has improved retention characteristics.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof in which.

It should, of course, be understood that the description and drawings herein are merely illustrative and that various modifications and changes can be made in the structures disclosed without departing from the spirit of the invention.

Like numerals refer to like parts throughout the several views.

DESCRIPTION OF THE PREFERRED EMBODIMENT

When referring to the preferred embodiment, certain terminology will be utilized for the sake of clarity. Use of such terminology is intended to encompass not only the described embodiment, but also technical equivalents which operate and function in substantially the same way to bring about the same result.

Figure 1:
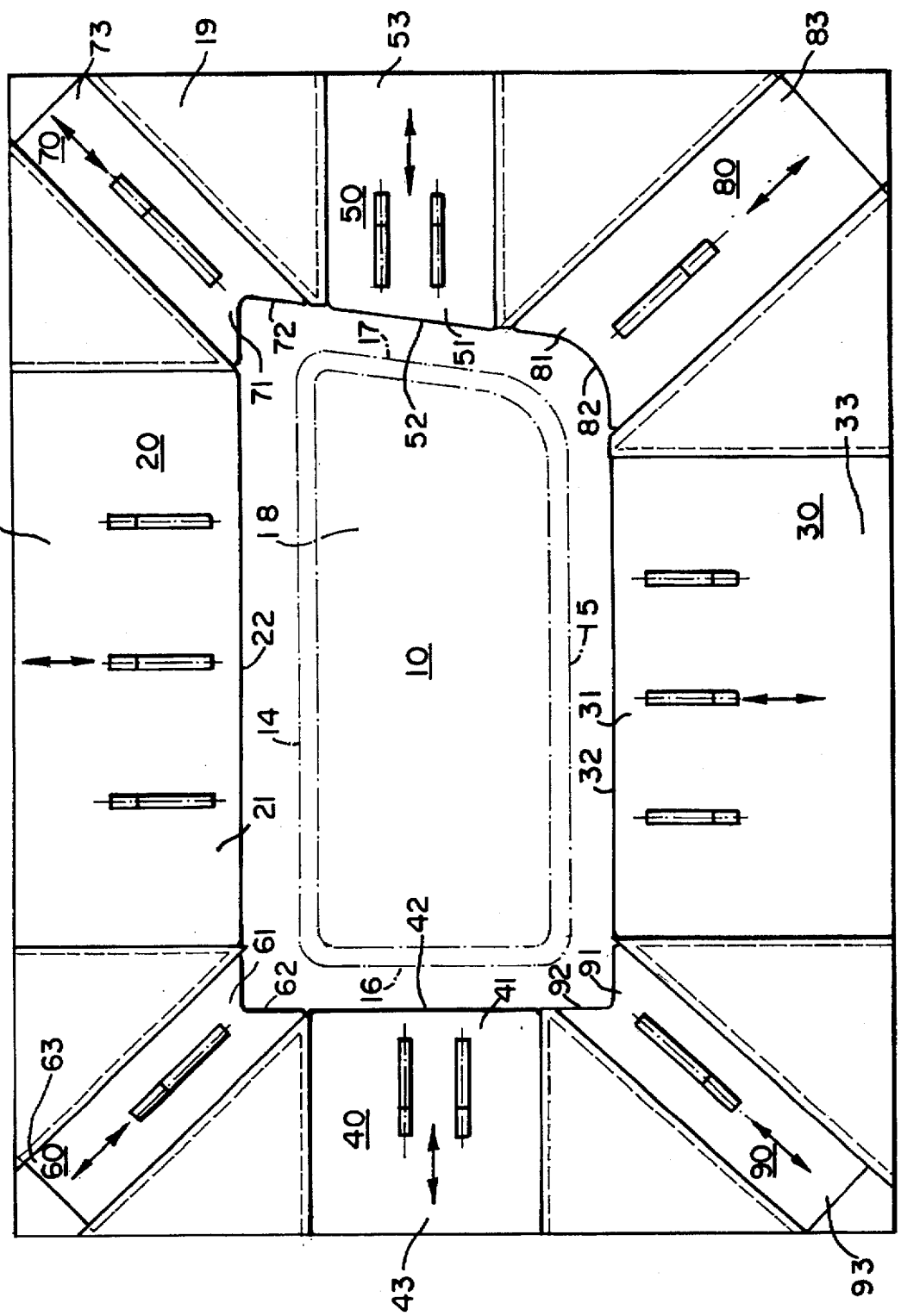
FIG. 1 is a top plan view of the apparatus used to construct panels in accordance with the invention.
Figure 2:
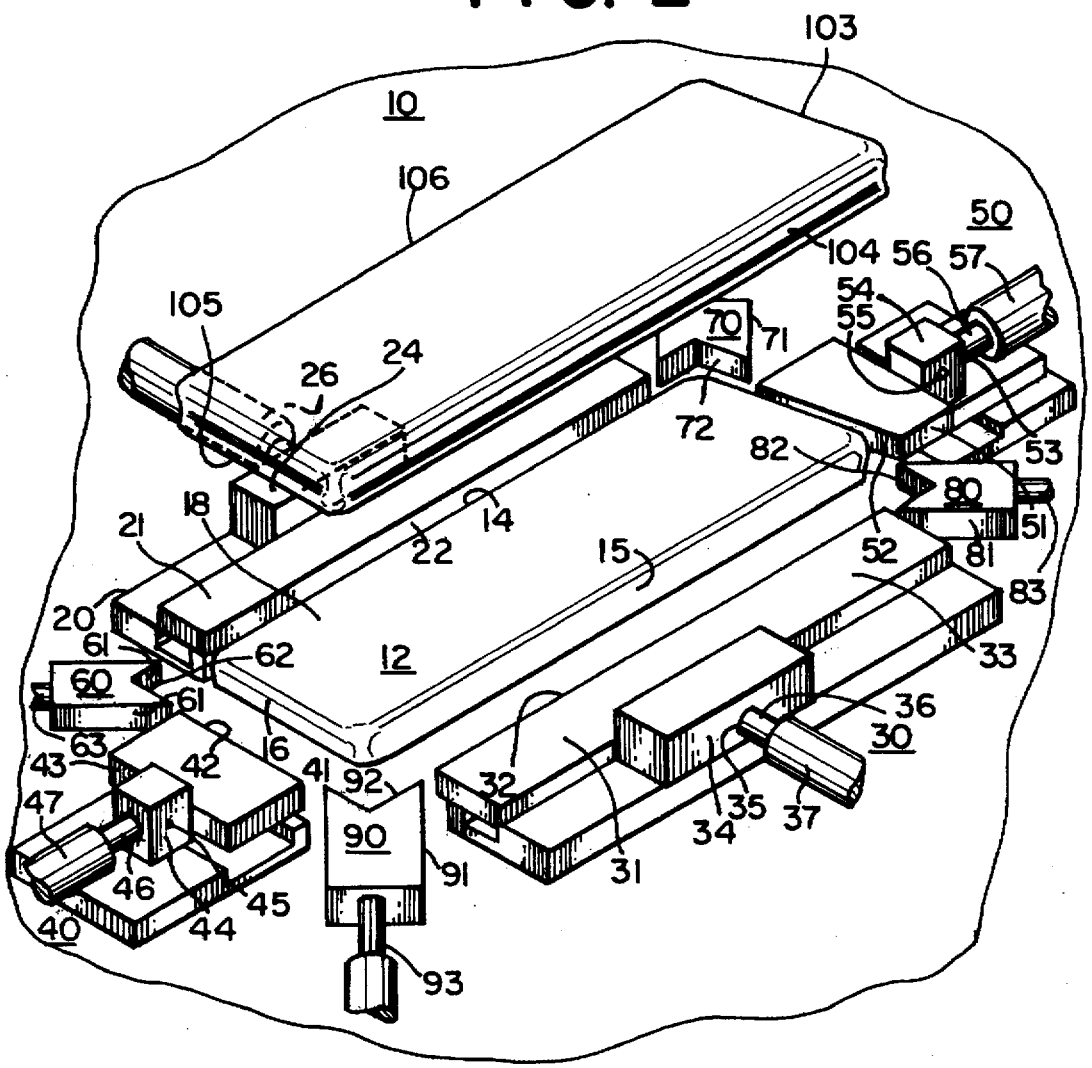
FIG. 2 is an exploded perspective view of a finished panel and the apparatus of FIG. 1.
Figure 3:
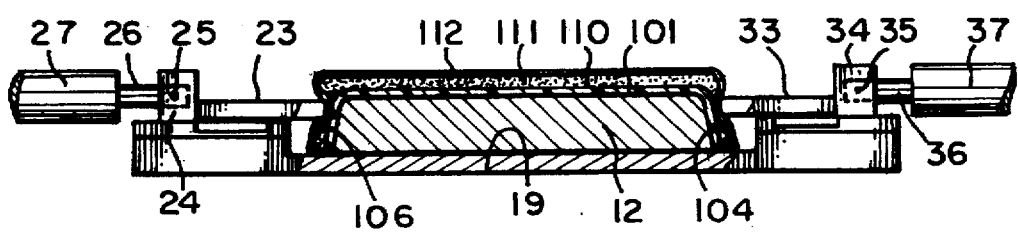
FIG. 3 is an end elevational view, in partial section, of a panel and the apparatus of FIG. 1 in sealing position.

Referring now more particularly to FIGS. 1–3 of the drawings, one embodiment of panel construction apparatus 10 and a finished panel 11 is therein illustrated.

The apparatus 10 includes a horn or male die 12, which is of rectangular configuration with top and bottom sides 14 and 15, left and right ends 16 and 17, and a flat top 18. The die 12 has rounded edges at the intersection with the top and bottom sides 14 and 15, and the ends 16 and 17.

The horn 12 is preferably constructed of aluminum and is attached to an electrical ground (not shown). The horn 12 is also mounted to a heat resistant base 19, which serves to support and guide the rest of the apparatus to be described.

The apparatus 10 includes a top heat seal punch 20, which includes a flat punch plate 21 of rectangular configuration carried on the base 19, and with a forward edge 22 facing top side 14 of the horn 12, and extending therealong.

The punch plate 21 is preferably constructed of an electrically conductive metal, and has a lead 23 connected to the positive side of an intermittent source of electrical energy (not shown).

The plate 21 is connected to an electrically insulated block 24, which is connected by pin 25 to a rod 26 from a double acting air cylinder 27, which is connected to a source of air under pressure (not shown).

A bottom heat seal punch 30 is provided, similar to punch 20, which includes a flat punch plate 31 of rectangular configuration carried on base 19, and with a forward edge 32 facing bottom side 15 of horn 12.

The punch plate 31 is preferably constructed of an electrically conductive metal, and has a lead 33 connected to the positive side of an intermittent source of electrical energy (not shown).

The plate 31 is connected to an electrically insulated block 34, which is connected by pin 35 to a rod 36, from a double acting air cylinder 37, which is connected to a source of air under pressure (not shown).

A left end heat seal punch 40 is provided, which includes a flat punch plate 41 of rectangular configuration, carried on the base 19 and with a forward edge 42 facing left end 16 of horn 12.

The punch plate 41 is preferably constructed of an electrically conductive metal, and has a lead 43 connected to the positive side of an intermittent source of electrical energy (not shown).

The plate 41 is connected to an electrically insulated block 44, which is connected by pin 45 to a rod 46, from a double acting air cylinder 47, which is connected to a source of air under pressure (not shown).

A right end heat seal punch 50 is provided, similar to punch 40, which includes a flat punch plate 51 of rectangular configuration carried on base 19, and with a forward edge 52 facing right end 17 of horn 12.

The punch plate 52 is preferably constructed of an electrically conductive metal, and has a lead 53 connected to the positive side of an intermittent source of electrical energy (not shown).

The plate 51 is connected to an electrically insulated block 54 which is connected by pin 55 to a rod 56, from a double acting air cylinder 57, which is connected to a source of air under pressure (not shown).

An upper left corner heat seal punch 60 is provided, which includes a flat punch plate 61 of rectangular configuration carried on base 19, and with a U-shaped edge 62 facing horn 12.

The punch plate 61 is preferably constructed of an electrically conductive metal, and has a lead 63 connected to the positive side of an intermittent source of electrical energy (not shown).

The plate 61 is connected to an electrically insulated block 64, which is connected by pin 65 to a rod 66, from a double acting air cylinder 67, which is connected to a source of air under pressure (not shown).

An upper right corner heat seal punch 70 is provided, similar to punch 60, which includes a flat punch plate 71 of rectangular configuration, carried on base 19, and with a U-shaped edge 72 facing horn 12.

The punch plate 71 is preferably constructed of an electrically conductive metal, and has a lead 73 connected to the positive side of an intermittent source of electrical energy (not shown).

The plate 71 is connected to an electrically insulated block 74, which is connected by pin 75 to a rod 76, from a double acting air cylinder 77, which is connected to a source of air under pressure (not shown).

A lower right corner heat seal punch 80 is provided, similar to punch 60, which includes a flat punch plate 81 of rectangular configuration, carried on base 19, and with a U-shaped edge 82 facing horn 12.

The punch plate 81 is preferably constructed of an electrically conductive metal, and has a lead 83 connected to the positive side of an intermittent source of electrical energy (not shown).

The plate 81 is connected to an electrically insulated block 84, which is connected by pin 85 to a rod 86, from a double acting air cylinder 87, which is connected to a source of air under pressure (not shown).

A lower left corner heat seal punch 90 is provided, similar to punch 60, which includes a flat punch plate 91 of rectangular configuration carried on base 19, and with a U-shaped edge 92 facing horn 12.

The punch plate 91 is preferably constructed of an electrically conductive metal, and has a lead 93 connected to the positive side of an intermittent source of electrical energy (not shown).

The plate 91 is connected to an electrically insulated block 94, which is connected by pin 95 to a rod 96, from a double acting air cylinder 97, which is connected to a source of air under pressure (not shown).

Referring to FIGS. 2 and 3, the panel 11 formed by the panel construction apparatus 10 described above is illustrated. The panel 11 includes a substrate 101 of overall rectangular configuration with a flat top 102, and sides 103, 104, 105 and 106 extending perpendicularly therefrom, and which fits over the contours of horn 12. The substrate 101 can be vacuum formed of any suitable plastic, with A.B.S. plastic being particularly suitable.

The substrate 101 as illustrated has a layer 110 thereon of heat activated adhesive fabric of well known type, with Spunfab adhesive fabric being desirable, and available from Spunfab, Inc. of Akron Ohio.

A layer 111 of heat bondable foam of well known type is provided on top of adhesive layer 110, and preferably of polyvinylchloride resin impregnated foam.

A cover layer 112 is provided on top of layer 111, which can be of vinyl, leather or other suitable material, and which is capable of bonding to foam layer 111. It should be noted that the layer 110 of adhesive fabric may be omitted if desired, depending on the characteristics of the foam layer 111.

The mode of operation of the panel construction apparatus will now be described.

The substrate 101 is placed on horn 12 of apparatus 10 with all the heat punches in retracted position. A layer 110 of adhesive fabric may be placed on substrate 101. A layer 111 of heat bondable foam may be placed on layer 110 with a cover layer 112 placed on layer 111. The layers 110, 111 and 112 all extend over the sides 103 of the substrate.

The top and bottom heat punches 20 and 30 have their plates 21 and 31 brought in by air cylinders 27 and 37 until the plates 21 and 31 sufficiently compress the layers 110, 111 and 112. The electrical energy source (not shown) is activated to cause the layers 110, 111 and 112 and the substrate 101 to fuse together. The top and bottom punches are retracted and the left and right end punches 40 and 50 are brought in as described above, and electrical energy applied to melt and fuse the ends to the substrate. The upper left and right punches 60 and 70 and the lower right and left punches 80 and 90 are brought in as described above, and the corners of the panel 100 fused. The corner punches 60, 70, 80 and 90 are retracted and panel 100 removed for use.

It will thus be seen that structure has been provided with which the objects of the invention are achieved.

I claim:

1. Panel construction apparatus for constructing panels for use in automotive door panels which comprises an upright horn of metal, forming part of a die to receive a multi-layered panel means, said panel means including plastic substrate means, a layer of heat bondable foam means and a layer of cover means, a plurality of heat punch means around the perimeter of said horn, said heat punch means including punch plate means movable horizontally to selectively engage and compress said panel means against said horn, and to retract therefrom, and a source of dielectric energy connected to said punch plate means to apply energy to said panel means while compressed to cause said foam means and said cover layer means to melt and fuse to said substrate means.

2. Apparatus as defined in claim 1 in which a layer of adhesive fabric is applied to said substrate prior to the application of said foam means.

* * * * *